United States Patent
Lymberopoulos et al.

(10) Patent No.: US 10,819,811 B2
(45) Date of Patent: Oct. 27, 2020

(54) ACCUMULATION OF REAL-TIME CROWD SOURCED DATA FOR INFERRING METADATA ABOUT ENTITIES

(71) Applicant: Microsoft Technology Licensing, LLC, Redmond, WA (US)

(72) Inventors: Dimitrios Lymberopoulos, Bellevue, WA (US); Jie Liu, Medina, WA (US); He Wang, Durham, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/105,665

(22) Filed: Aug. 20, 2018

(65) Prior Publication Data
US 2019/0007510 A1    Jan. 3, 2019

Related U.S. Application Data

(63) Continuation of application No. 13/743,339, filed on Jan. 17, 2013, now abandoned.

(51) Int. Cl.
*G06F 13/00* (2006.01)
*H04L 29/08* (2006.01)
(Continued)

(52) U.S. Cl.
CPC ............ *H04L 67/22* (2013.01); *G06F 16/335* (2019.01); *G06F 16/337* (2019.01);
(Continued)

(58) Field of Classification Search
CPC ...... G06F 13/00; G06F 16/335; G06F 16/337; G06F 16/907; G06F 16/9535;
(Continued)

(56) References Cited

U.S. PATENT DOCUMENTS

2010/0299615 A1    11/2010   Miluzzo et al.
2012/0124176 A1     5/2012   Curtis et al.
(Continued)

FOREIGN PATENT DOCUMENTS

EP     2320625 A1      5/2011
WO     2009043020 A3   4/2009

OTHER PUBLICATIONS

Lwin, et al., "Web-Based GIS System for Real-Time Field Data Collection Using a Personal Mobile Phone", Journal of Geographic Information System, Oct. 2011, pp. 1-8.
(Continued)

*Primary Examiner* — Robert B Harrell
(74) *Attorney, Agent, or Firm* — Medley, Behrens & Lewis, LLC

(57) ABSTRACT

Various technologies pertaining to crowd sourcing data about an entity, such as a business, are described. Additionally, technologies pertaining to inferring metadata about the entity based upon crowd sourced data are described. A sensor in a mobile computing device is activated responsive to a user of the mobile computing device checking in at an entity. Metadata, such as occupancy at the entity, noise at the entity, and the like is inferred using the data captured by the sensor. A search result for the entity includes the metadata.

20 Claims, 13 Drawing Sheets

(51) Int. Cl.
  H04W 4/21    (2018.01)
  G06Q 10/10   (2012.01)
  G06Q 30/02   (2012.01)
  G06Q 50/00   (2012.01)
  G06F 16/907  (2019.01)
  G06F 16/335  (2019.01)
  G06F 16/9535 (2019.01)
  G10L 25/48   (2013.01)

(52) U.S. Cl.
  CPC ........ *G06F 16/907* (2019.01); *G06F 16/9535* (2019.01); *G06Q 10/103* (2013.01); *G06Q 30/0205* (2013.01); *G06Q 30/0261* (2013.01); *G06Q 30/0267* (2013.01); *G06Q 50/01* (2013.01); *H04L 67/12* (2013.01); *H04W 4/21* (2018.02); *G10L 25/48* (2013.01)

(58) Field of Classification Search
  CPC ............... G06F 17/30; G06F 17/30699; G06F 17/30702; G06F 17/30867; G06F 17/30997; G06Q 10/10; G06Q 10/103; G06Q 30/02; G06Q 30/0205; G06Q 30/0261; G06Q 30/0267; G06Q 30/0631; G06Q 50/00; G06Q 50/01; G10L 25/48; H04L 12/581; H04L 29/06; H04L 29/08; H04L 29/06027; H04L 29/08072; H04L 29/08108; H04L 29/08657; H04L 29/08936; H04L 65/403; H04L 67/12; H04L 67/22; H04W 4/02; H04W 4/21; H04W 4/029; H04W 64/00
  USPC ...................................... 455/456.3; 709/204
  See application file for complete search history.

(56) References Cited

U.S. PATENT DOCUMENTS

| | | | |
|---|---|---|---|
| 2012/0218436 A1 | 8/2012 | Rhoads et al. | |
| 2012/0233158 A1 | 9/2012 | Braginsky et al. | |
| 2012/0233238 A1 | 9/2012 | Braginsky et al. | |
| 2012/0258776 A1 | 10/2012 | Lord et al. | |
| 2012/0324042 A1 | 12/2012 | Graham et al. | |
| 2013/0127634 A1 | 5/2013 | Grumbles, III | |
| 2014/0025799 A1 | 1/2014 | Azizi et al. | |
| 2014/0141807 A1* | 5/2014 | Jokela | H04W 4/02 455/456.3 |
| 2014/0201276 A1 | 7/2014 | Lymberopoulos et al. | |

OTHER PUBLICATIONS

Schuster, et al., "Cutting Costs, Boosting Quality and Collecting Data Real-Time—Lessons from a Cell Phone-Based Beneficiary Survey to Strengthen Guatemala's Conditional Cash Transfer Program", Retrieved at <<http://siteresources.worldbank.org/INTLAC/Resources/257803-1269390034020/EnBreve_166_Printable.pdf>>, Feb. 2011, pp. 1-3.

Gutiérrez, et al., "Towards Real-Time Metadata for Sensor-Based Networks and Geographic Databases", Retrieved at <<http://www.isprs.org/proceedings/XXXVI/2-C43/Session1/paper_gutierrez_servigne.pdf>>, Retrieved Date: Oct. 31, 2012, pp. 1-8.

Anantharam, et al., "Demonstration: Dynamic Sensor Registration and Semantic Processing for Ad-Hoc Mobile Environments (SemMOB)", Retrieved at <<http://knoesis.wright.edu/library/download/SemMOB.pdf>>, Retrieved Date: Oct. 31, 2012, pp. 1-4.

Aly, "Survey on Multiclass Classification Methods", Technical Report, California Institute of Technology, 2005, pp. 1-9.

Asano, et al., "Real-time Sound Source Localization and Separation System and its Application to Automatic Speech Recognition" In Eurospeech 2001, pp. 1013-1016.

Azizyan, et al., "Surroundsense: Mobile Phone Localization via Ambience Fingerprinting", In ACM MobiCom '09, 2009, pp. 1-12.

Chon, et al., "Automatically Characterizing Places with Opportunistic Crowdsensing using Smartphones", In ACM UbiComp '12, 2012, pp. 1-10.

Gaonkar, et al., "Micro-Blog: Sharing and Querying Content Through Mobile Phones and Social Participation", in ACM MobiSys '08, 2008, pp. 174-186.

Hasan, et al., "Speaker Identification Using Mel Frequency Cepstral Coefficients", in ICECE 2004, 2004, pp. 565-568.

Hirsch, et al., "The Aurora Experimental Framework for the Performance Evaluation of Speech Recognition Systems Under Noisy Conditions", In ISCA ITRW ASR2000, 2000, pp. 1-8.

Kinnunen, et al., "Real-time Speaker Identification and Verification", IEEE Trans. Audio Speech and Language Process, 2006, pp. 1-13.

Korpipaa, et al., "Managing context information in mobile devices", IEEE Pervasive Computing, 2003, pp. 42-51.

Lu, et al., "Speakersense: Energy Efficient Unobtrusive Speaker Identification on Mobile Phones", In In Proceedings of the 9th International Conference on Pervasive Computing, Pervasive '11, 2011, pp. 188-205.

Lu, et al., "Soundsense: Scalable Sound Sensing for People-Centric Applications on Mobile Phones", In ACM MobiSys'09, 2009, pp. 1-14.

Miluzzo, et al., "Darwin Phones: The Evolution of Sensing and Inference on Mobile Phones", in ACM MobiSys' 10, 2010, pp. 5-20.

Nakadai, et al., "Real-time Sound Source Localization and Separation for Robot Audition", in IEEE ICSLP 2002, pp. 1-4.

www.scenetap.com, Retrieved at <<http://www.scenetap.com>>, Retrieval Date: Jan. 16, 2013, pp. 1-3.

Tarzia, et al., "Indoor Source Localization Using a Microphone Array on a Mobile Robot", in IEEE/RSJ IROS 2003, 2003, pp. 1-14.

Zhou, et al., Iodetector: A Generic Service for Indoor Outdoor Detection. In ACM SenSys'12, 2012, pp. 1-14.

"Office Action for U.S. Appl. No. 13/743,339", dated May 19, 2015, 39 pages.

"Response to Office Action for U.S. Appl. No. 13/743,339", filed Nov. 19, 2015, 12 pages.

"Office Action for U.S. Appl. No. 13/743,339", dated Feb. 26, 2016, 11 pages.

"Response to Office Action for U.S. Appl. No. 13/743,339", filed Aug. 26, 2016, 11 pages.

"Final Office Action for U.S. Appl. No. 13/743,339", dated Nov. 30, 2016, 17 pages.

"Response to Final Office Action for U.S. Appl. No. 13/743,339", filed May 30, 2017, 11 pages.

"Office Action for U.S. Appl. No. 13/743,339", dated Jun. 22, 2017, 6 pages.

"Response to Office Action for U.S. Appl. No. 13/743,339", filed Nov. 22, 2017, 27 pages.

"Final Office Action for U.S. Appl. No. 13/743,339", dated Mar. 20, 2018, 22 pages.

"International Search Report & Written Opinion for PCT Patent Application No. PCT/US2014/011375", dated Sep. 29, 2014, 9 Pages.

"Office Action Issued in European Patent Application No. 14702158.8", dated Feb. 2, 2016, 6 Pages.

"Search Report Issued in European Patent Application No. 14702158.8", dated Jan. 5, 2016, 3 Pages.

Kanjo, Eiman, "NoiseSPY: A Real-Time Mobile Phone Platform for Urban Noise Monitoring and Mapping", In Journal of Mobile Networks and Applications, vol. 15, Issue 4, Aug. 1, 2010, pp. 562-574.

"First Office Action and Search Report Issued in Chinese Patent Application No. 201480005183.4", dated Dec. 29, 2017, 13 Pages.

* cited by examiner

| SEARCH RESULT 1 | OCCUPANCY: HIGH |
| ADDRESS: | CHATTER: NORMAL |
| TELEPHONE NUMBER | MUSIC: LOW |
| RATING | OUTDOOR SECTION: YES |
| | NOISE: LOW |

ACCUMULATION OF REAL-TIME CROWD SOURCED DATA FOR INFERRING METADATA ABOUT ENTITIES

RELATED APPLICATION

This application is a continuation of U.S. patent application Ser. No. 13/743,339, filed on Jan. 17, 2013, and entitled "ACCUMULATION OF REAL-TIME CROWD SOURCED DATA FOR INFERRING METADATA ABOUT ENTITIES". The entirety of this application is incorporated herein by reference.

BACKGROUND

Search engines are computer-implemented systems that are configured to provide information to a user that is relevant to the information retrieval intent of such user. Generally, this intent is at least partially represented by terms of a query submitted to the search engine by the user. Responsive to receipt of the query, the search engine provides the user with a ranked list of search results, wherein search results determined to be most relevant by the search engine are positioned most prominently (e.g., highest) in the ranked list of search results.

Some search engines have been further adapted to perform local searches, where search results are retrieved based upon a location provided by a user (either explicitly or implicitly based upon a sensed current location of the user). For example, when the user employs a mobile telephone to perform a local search, a GPS sensor on the telephone can be employed to provide the search engine with the current location of the user. The user then sets forth a query, and search results relevant to both the provided location and the query are provided to the user by the search engine. Oftentimes, when performing a local search, the user is looking for a particular type of business, such as a restaurant, pub, retail store, or the like.

Generally, search results retrieved by the search engine for a local search are ranked in accordance with one or more features, such as a distance between the location provided by the user and an entity represented by a respective search result, user rankings for the entity represented by the respective search result, popularity of the entity represented by the respective search result (e.g., based upon a number of user clicks), or the like. Information about the entity included in the search result, however, may be stale. For instance, a most recent user review about an entity may be several months old, and is therefore not indicative of current or recent activity at the entity. Furthermore, reviews or ratings for a large number of local entities might not be available.

SUMMARY

The following is a brief summary of subject matter that is described in greater detail herein. This summary is not intended to be limiting as to the scope of the claims.

Described herein are various technologies pertaining to crowd sourcing data that is indicative of a state of at least one parameter of an entity, and utilizing crowd sourced data to provide information to users as to the state of the at least one parameter of the entity. In an example, the entity may be a business, such as an eatery, the parameter may be noise level of the eatery, and the state of such parameter may be "low," "normal," "high," or "very high." Other parameters that crowd sourced data may be indicative of include, but are not limited to, lighting level of an entity, occupancy of the entity, type of music being played at the entity, level of noise of music being played at the entity, level of human chatter (conversation) at the entity, a particular song being played at the entity, whether the entity has an outdoor area, temperature at the entity, humidity level at the entity, barometric pressure at the entity, amongst other parameters.

In an exemplary embodiment, sensors of mobile computing devices of users can be leveraged to crowd source data that is indicative of a state of at least one parameter of an entity. Pursuant to an example, a user of a mobile computing device may employ such device to publish her presence at a particular entity. For example, the user may choose to "check-in" to a certain entity (business or other predefined location) through utilization of a social networking application that is accessible to the user on the mobile computing device. Since it is known that the user is at the entity (due to the user checking into the entity), and it is further known that the mobile computing device is in the hand of the user (rather than a pocket or bag), then it can be presumed that at least one sensor of the mobile computing device is exposed to a current environmental condition at the entity. Thus, the sensor, at least for a relatively short period of time, can capture data that is indicative of a state of at least one parameter of the entity. Therefore, immediately responsive to the user indicating her presence at the entity, at least one sensor of the mobile computing device can be activated and caused to capture data. In an exemplary embodiment, the at least one sensor can be a microphone that is configured to capture an audio stream. For instance, the microphone can be activated for some relatively small threshold amount of time, such as 5 seconds or 10 seconds. The audio stream captured by the microphone can be streamed as it is captured at the mobile computing device to another computing device by way of a wireless network connection. In another embodiment, a data packet that comprises an entirety of the audio stream can be transmitted to the another computing device subsequent to the audio stream being captured at the mobile computing device. The process of capturing data from sensors of mobile computing devices as their respective users check in to certain entities can be undertaken for numerous mobile computing devices at several entities, resulting in crowd sourced data for numerous entities. Furthermore, in an exemplary embodiment, raw audio data can be transmitted to the another computing device, wherein the another computing device thereafter generates features that will be described below. Alternatively, the mobile computing device can generate the features, and can subsequently send such features (without the raw audio data) to the another computing device.

Data captured by a mobile computing device in the manner described above can be employed to provide a relatively recent and accurate picture of a current state of at least one parameter of an entity. For instance, 10 seconds worth of data captured by a mobile computing device at an entity can be received and processed at a server or at the mobile computing device, wherein the processed data can be used to estimate the state of the at least one parameter of the entity. Such processing can be undertaken shortly after the data is received. For instance, the received sensor data can be segmented into a plurality of relatively small time segments (e.g., one second segments), and features can be extracted from each segment, thereby creating a respective feature vector for each segment. Such feature vectors, in an example, may then be transmitted to the server. Subsequently, for each feature vector, a classifier can probabilistically determine the state of the parameter using a respective feature vector as input. Therefore, for example, the classifier can output a classification for the state of the parameter for each segment in the plurality of segments. A majority voting technique may then be employed to determine a final classification of the state of the parameter, and such classification can be stored in a computer-readable data repository together with information included in a search result for the entity. Thus, for instance, if a search result for the entity is presented to an issuer of a query, the search result can include data indicative of the estimated state of the aforementioned parameter of the entity. In an example, therefore, the entity may be a restaurant, and the search result can indicate that there is currently a high level of occupancy at the restaurant, there is currently a low noise level at the restaurant, etc.

In another exemplary embodiment, a search engine index can be updated to include real-time or near real-time metadata about an entity, such that search results can be ranked based upon the real-time or near real-time metadata. Pursuant to an example, data about a business can be crowd sourced in the manner described above. With respect to a particular business, inferred metadata about the business can indicate that currently, there is a high level of occupancy at the business, and currently rock music is being played at the business. A person searching for a particular place to visit with friends may submit the query "crowded bar playing rock music" to the search engine, and the search engine can highly rank a search result for the business since it maps to the information retrieval intent of the user (e.g., despite the business not being closest in proximity to the issuer of the query).

Other aspects will be appreciated upon reading and understanding the attached figures and description.

BRIEF DESCRIPTION OF THE DRAWINGS

FIG. 5 illustrates an exemplary search result for an entity.

DETAILED DESCRIPTION

Figure 1:
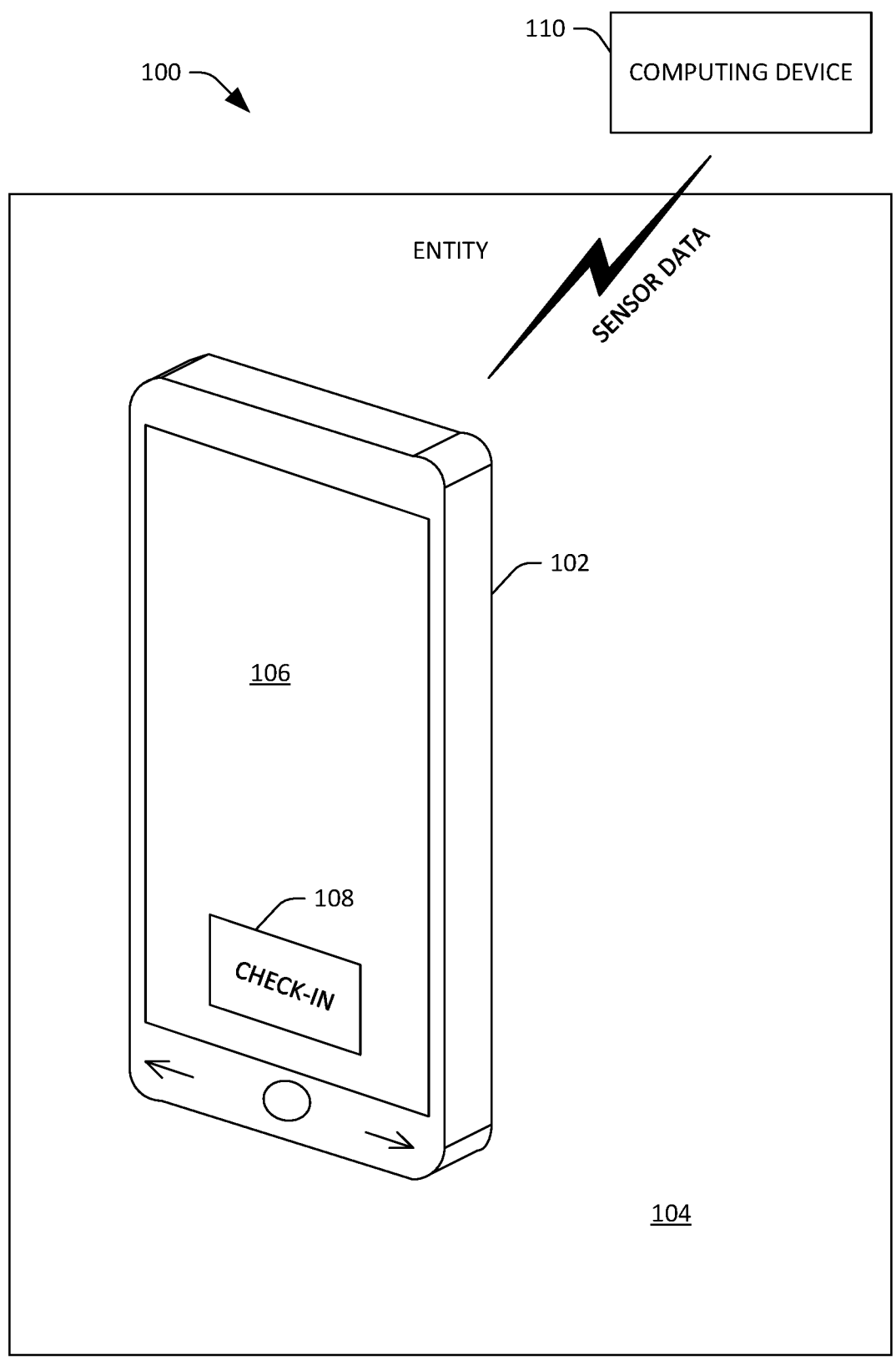
FIG. 1 illustrates an exemplary mobile computing device that can be employed in connection with crowd sourcing data about an entity.

Various technologies pertaining to crowd sourcing data about entities, and utilizing such data to infer states of parameters of the entities, will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary depiction 100 of a mobile computing device being employed in connection with crowd sourcing data about an entity is illustrated. In the example shown in FIG. 1, a mobile computing device 102 is at a particular entity 104. In an exemplary embodiment, the entity 104 can be one of a plurality of entities that are predefined in a social networking application. For example, the entity 104 may be a business, such as a restaurant, a pub, a retail outlet, a movie theater, an amusement park, a golf course, etc. In another example, the entity 104 may be a monument or other known location, such as an airport, a stadium, a park, a tourist attraction, an arena, a library, or the like.

The mobile computing device 102, as will be described in greater detail below, may comprise a plurality of sensors, wherein such sensors may include a microphone, a GPS sensor (or other positioning sensor), a gyroscope, a barometer, a humidity sensor, a thermometer, amongst other sensors. While the mobile computing device 102 is shown as being a mobile telephone, it is to be understood that the mobile computing device 102 may be some other suitable mobile computing device, such as a tablet computing device (sometimes referred to as a slate computing device), a portable media player, an e-reader, or the like.

The mobile computing device 102 can be configured to access the above-mentioned social networking application, wherein the user of the mobile computing device can publish messages via the social networking application. For instance, the mobile computing device 102 may have the social networking application installed thereon. In another exemplary embodiment, the mobile computing device 102 may have a web browser installed thereon, such that the social networking application is accessible by way of the web browser. In still yet another exemplary embodiment, the mobile computing device 102 may be configured with an operating system that includes functionality that enables the operating system to communicate with the social networking application.

The mobile computing device 102 is shown as including a touch-sensitive display 106, wherein a button 108 is displayed thereon. When the button 108 is depressed, the user of the mobile computing device 102 is indicating a desire to publish that such user is at the entity 104. In some social networking applications, such publishing is referred to as the user "checking in" at the entity 104. When the user selects the button 108 by pressing a finger on such button 108, for example, at least one sensor of the mobile computing device 102 can be activated to capture data that is indicative of a current state of at least one parameter of the entity 104. For instance, immediately responsive to the user of the mobile computing device 102 pressing the button 108 to indicate that the user of the mobile computing device 102 is at the entity 104, a microphone of the mobile computing device 102 can be activated to capture an audio stream, wherein the audio stream is indicative of a level of occupancy at the entity 104, a level of volume of music being played at the entity 104, a level of background human chatter at the entity 104, a level of noise generally at the entity 104, a type of music being played at the entity, a particular song being played at the entity, etc. Similarly, for instance, responsive to the user selecting the button 108, a luminance sensor or camera can be activated to capture data that is indicative of level of luminance at the entity 104 (e.g., and therefore may be indicative of whether the mobile computing device 102 is outdoors when the user is checking in at the entity 104). In another example, a gyroscope of the mobile computing device 102 can be activated immediately responsive to the user of the mobile computing device 102 selecting the button 108, wherein data captured by the gyroscope can be indicative of movement of the mobile computing device 102 over a relatively short timeframe. Other exemplary sensors that can capture data that is indicative of a state (level) of at least one parameter of the entity have been noted above, although such list of sensors is not intended to be exhaustive.

After a predefined event has occurred, the sensor activated responsive to the user selecting the button 108 can be deactivated. In an example, the predefined event may be the passage of some relatively short threshold period of time (e.g., on the order of 5 seconds, 10 seconds, or 15 seconds). In another example, the predefined event may be depression of a power button on the mobile computing device 102, the mobile computing device 102 entering a low power (e.g., sleep) mode, or some other suitable event. In yet another example, the predefined event may be the obtainment of a suitable reading from the sensor (such as a convergence to a certain value, the obtainment of a value with some confidence of the value being correct, etc.) This may preserve the battery life of the mobile computing device 102, and may cause sensors to capture data about the entity 104 with relatively high accuracy. In the example of the microphone, since the user must select the button 108, it can be inferred that the mobile computing device 102 is not in a pocket or bag of the user of the mobile computing device 102, and that data captured by the microphone is therefore not muffled or otherwise affected.

The mobile computing device 102 is then configured to transmit data captured by at least one sensor of the mobile computing device 102 to a computing device 110 by way of a suitable wireless network. In an exemplary embodiment, the mobile computing device 102 can be configured to stream data as it is captured by the at least one sensor to the computing device 110. In another exemplary embodiment, the mobile computing device 102 can be configured to generate a data packet that includes the data captured by the sensor when in an active state, and transmit such data packet to the computing device 110. Optionally, the mobile computing device 102 can be configured to compress such data packet prior to transmitting the data packet to the computing device 110. Still further, rather than transmitting raw sensor data to the computing device 110, the mobile computing device 102 can perform processing on the sensor data and transmit the result of such processing to the computing device 110. For instance, as will be described in greater detail below, the mobile computing device 102 can segment the sensor data into numerous segments, and then generate a feature vector for each segment. The mobile computing device 102 may then transmit the feature vectors (rather than the raw sensor data) to the computing device 110.

In an exemplary embodiment, a check can be performed prior to activating the sensor of the mobile computing device 102 and transmitting the data to the computing device 110. For instance, when the user checks in at the entity 104, a current location of the mobile computing device 102 (as output by a GPS sensor or other position sensor) can be compared with a known location of the entity 104; if the current location of the mobile computing device 102 does not map to the known location of the entity 104, then the sensor of the mobile computing device can remain in an inactive state. Thus, the at least one sensor may be activated only if the mobile computing device 102 is found to be at the known location of the entity 104.

As will be described in greater detail below, the computing device 110 can be configured to collect crowd sourced data about the entity 104 and other entities being checked into by other users of mobile computing devices to infer respective states of parameters of entities. With respect to the crowd sourced data received from the mobile computing device 102 shown in FIG. 1, the computing device 110 can process such data through utilization of one or more classifiers to infer, for example, the level of occupancy of the entity 104 at the time that the data was captured at the mobile computing device 102.

States of the parameters that can be inferred/determined based upon the data captured by the sensors of the mobile computing device 102 can be employed in a variety of different settings. For example, such states of parameters can be provided as portions of local search results about the entity 104. In an exemplary embodiment, the entity 104 may be a restaurant, and a user may set forth a query for restaurants that are proximate to the current location of the user. Search results retrieved responsive to the query being submitted can include a search result for the entity 104, and the search result can include information typically found in local search results, such as the name of the restaurant, the address of the restaurant, the telephone number of the restaurant, and the like. Additionally, information pertaining to the states of the aforementioned parameters can be included in the search result. Thus, the issuer of the query can quickly determine (assuming that there is relatively recent data about the entity 104) that the entity 104 has a particular level of occupancy, that the entity 104 has an outdoor area, that a particular type of music is being played at the entity at a certain volume, etc.

In other embodiments, the data generated at the mobile computing device 102 provided to the computing device 110 can be employed for the purpose of trend detection/analysis.

That is, over time, patterns for states of parameters of the entity 104 can be recognized based upon crowd sourced data about the entity 104. A search result for the entity can include or make reference to such patterns; thus, for instance, a search result for a restaurant can include information such as "on Friday nights between 6:00 p.m. and 8:00 p.m. the restaurant is historically very crowded." In still yet another exemplary embodiment, the data captured at the mobile computing device 102 provided to the computing device 110 can be utilized in connection with ranking search results. Thus, estimated states of parameters of the entity 104 can be included in a search engine index, thereby allowing a search engine to provide contextually relevant search results for queries such as "crowded restaurant in the warehouse district."

Figure 2:
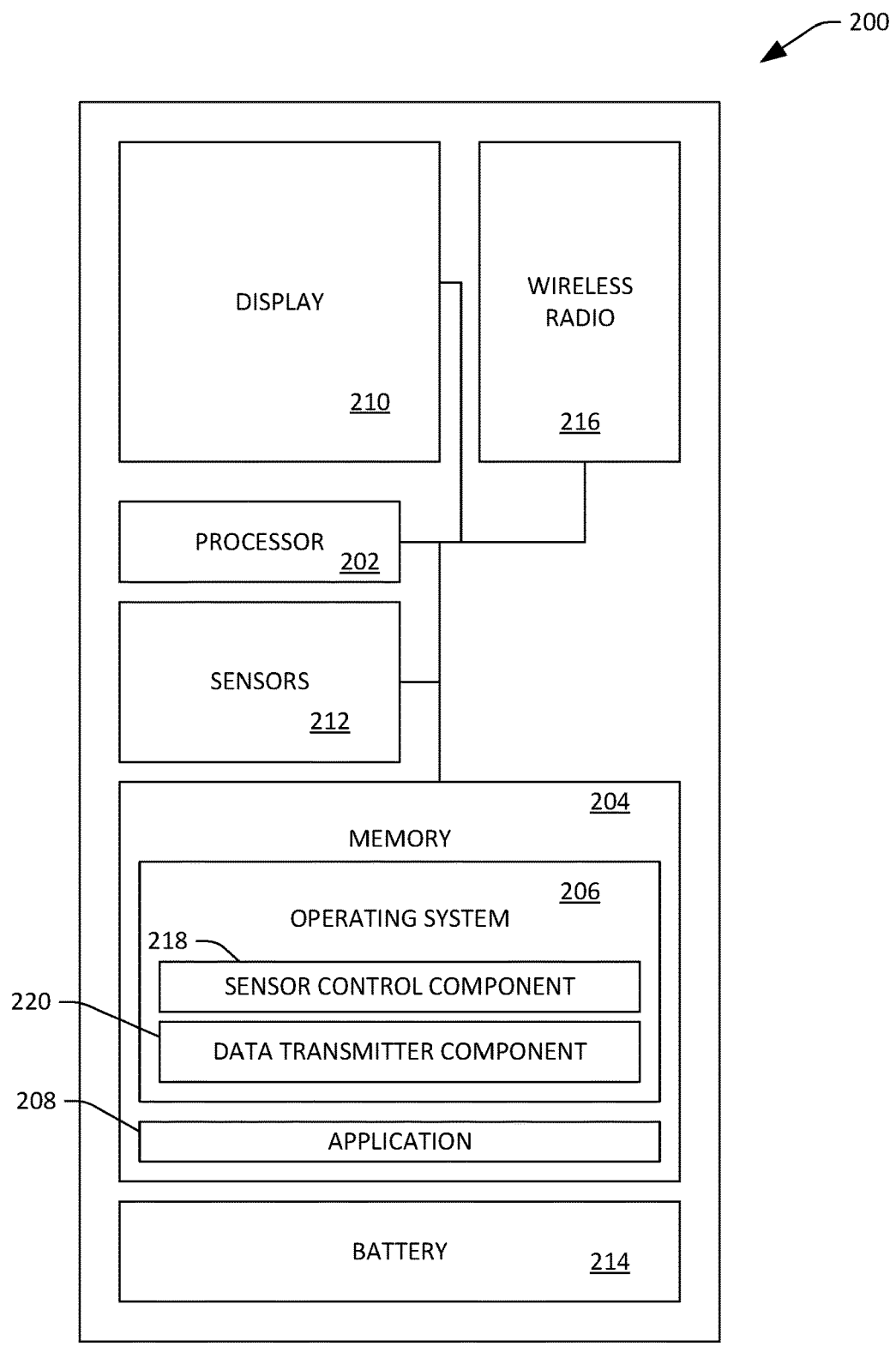
FIG. 2 is a functional block diagram of an exemplary mobile computing device.

Now referring to FIG. 2, a functional block diagram of an exemplary mobile computing device 200 is illustrated. As noted above, the mobile computing device 200, in exemplary embodiment, is a mobile telephone, although in other embodiments the mobile computing device 200 may be some other mobile computing device. The mobile computing device 200 comprises a processor 202 and a memory 204, wherein the processor 202 is configured to execute instructions retained in the memory 204. The processor 202 is intended to encompass a conventional processor utilized in mobile computing devices as well as a system on a chip (SoC) or cluster on a chip (CoC) systems. The memory 204 includes an operating system 206, which is configured to manage hardware resources of the mobile computing device 200. The memory 204 additionally includes, for instance, an application 208 that is executed by the processor 202, wherein the application 208 may be a social networking application or a browser that can access the social networking application.

The mobile computing device 200 further comprises a display 210, wherein in an exemplary embodiment, the display 210 may be a touch-sensitive display. The display 210 can be configured to display data corresponding to the application 208 when the application 208 is executed by the processor 202.

The mobile computing device 200 further comprises a plurality of sensors 212, wherein such sensors 212 may include a microphone, a GPS sensor, a humidity sensor, a thermometer, a camera, a luminance sensor, a barometer, or other suitable sensor. The sensors 212 can be selectively activated and deactivated by the processor 202. The mobile computing device 200 further comprises a battery 214 that is configured to provide energy to the hardware resources of the mobile computing device 200.

The mobile computing device 200 further comprises a wireless radio 216 that can be employed to receive and transmit data by way of a wireless network. In an exemplary embodiment, the wireless radio 216 can be configured to receive and transmit data by way of a cellular network. In another exemplary embodiment, the wireless radio 216 can be configured to receive and transmit data by way of a Wi-Fi network. In still yet another exemplary embodiment, the wireless radio 216 may be configured to receive and transmit data by way of a short range communications protocol, such as Bluetooth. It is to be understood, however, that the wireless radio 216 may be configured to receive and transmit data over any suitable type of wireless network.

The operating system 206 includes a sensor control component 218 that can selectively activate and deactivate the sensors 212. As noted above, a user of the mobile computing device 200 can access the social networking application by way of the application 208 in the memory 204. When the user is at a particular location (entity), the user may desire to publish her being at the location by way of the application 208. For instance, as shown in FIG. 1, the user can indicate that they are at a particular restaurant or other business, and "check in" to that restaurant or business by way of the application 208. The sensor control component 218 can receive the indication that the user desires to publish that she is at the location, and can selectively activate at least one sensor in the sensors 212, thereby causing the at least one sensor to capture data that is indicative of a state of at least one parameter of the location. As noted above, exemplary parameters of the location include, but are not limited to, occupancy level, music volume, background human chatter volume, noise volume, a music type being played at the location, a particular song being played at the location, temperature at the location, etc. Accordingly, the state of such parameter can be, for instance, low, normal, high, very high, may be a particular number (such as a certain temperature sensed by a thermometer), or the like.

After a predefined event as occurred, such as the mobile computing device 200 entering a low power mode, the passage of a threshold amount of time after the sensor control component 218 has activated the at least one sensor, or the obtainment of a suitable sensor reading, the sensor control component 218 can deactivate the at least one sensor. The operating system 206 may further include a data transmitter component 220 that is configured to cause the wireless radio 216 to transmit the data captured by the at least one sensor to the computing device 110, where such data can be processed.

Figure 3:
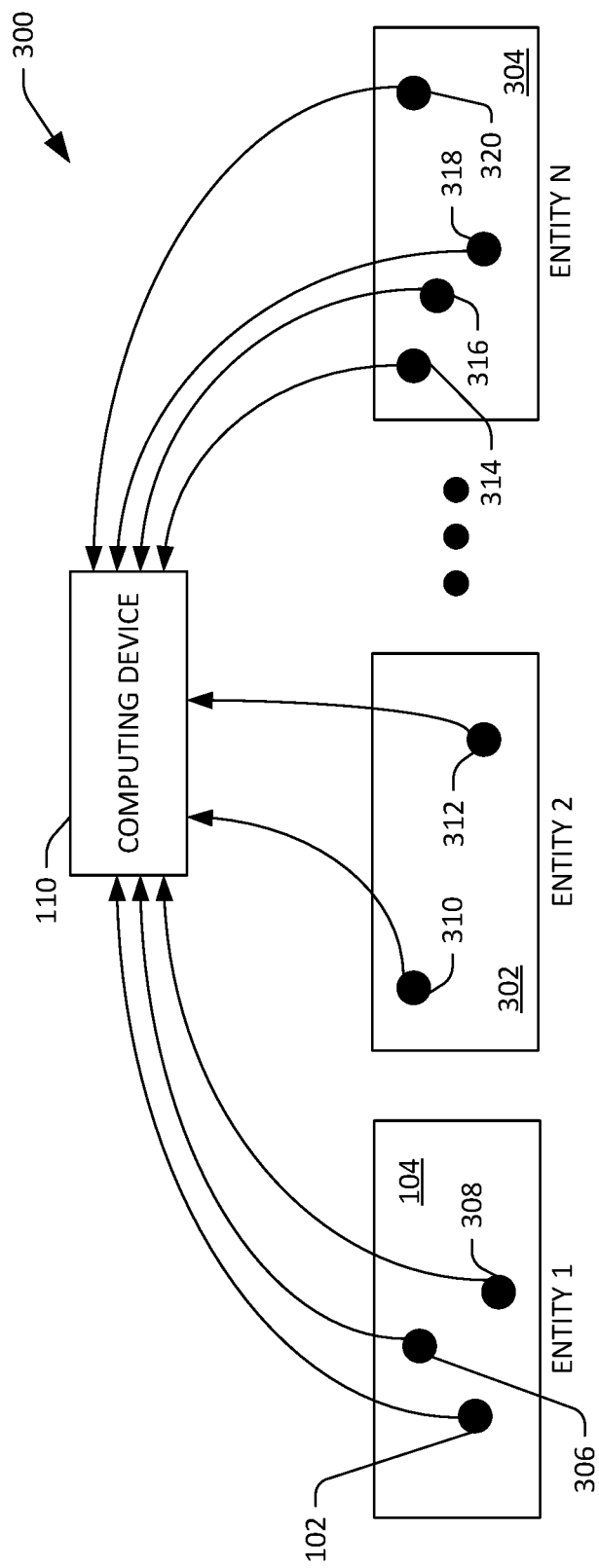
FIG. 3 illustrates crowd sourcing of data about numerous entities.

Now referring to FIG. 3, a depiction 300 of numerous sensors being used to crowd source data about various entities (e.g., businesses) is illustrated. A plurality of entities can be predefined in a social networking application. One of such entities may be the entity 104 shown in FIG. 1 (referred to as the first entity). Other locations can include a second entity 302 through an nth entity 304. The mobile computing device 102 may be at the first entity 104, and when the user of the mobile computing device 102 checks in at the first entity 104, as described above, data that is indicative of a state of at least one parameter of the first entity 104 can be transmitted to the computing device 110. Two sensors 306 and 308 may additionally be at the first entity 104. In an exemplary embodiment, the sensors 306 and 308 may be sensors in mobile computing devices that are activated in a manner similar to the manner that the sensor of the mobile computing device 102 is activated (when users of mobile computing devices that respectively include such sensors 306 and 308 "check in" at the first entity 104). In other embodiments, however, at least one of the sensors 306 or 308 may be another type of sensor that can capture data that is indicative of a state of at least one parameter of the first entity 104. For instance, the sensor 306 may be a microphone that is permanently located at the entity captures audio data at the first entity 104 (e.g., is not a portion of a mobile computing device).

Sensors 310 and 312 are shown as being at the second entity 302, and can output data that is indicative of a state of at least one parameter of the second entity 302 to the computing device 110. Such sensors 310 and 312, in an exemplary embodiment, may be sensors in respective mobile computing devices that are activated responsive to users of the mobile computing devices "checking in" at the second entity 302.

Four sensors 314-320 may be at the nth entity 304, and can transmit data about the nth entity 304 to the computing device 110. One or more of such sensors may be relatively permanent sensors that are associated with the nth entity 304, such as video cameras, microphones, thermometers, etc., while other sensors in the sensors 314-320 may be included in respective mobile computing devices and are selectively activated upon users of the mobile computing devices "checking in" at the nth entity 304.

In an exemplary embodiment, since, for example, the nth entity 304 has multiple data streams received by the computing device 110 pertaining to the state of the at least one parameter, the computing device 110 can aggregate such data to reduce the possibility of incorrectly estimating the state of the at least one parameter. Moreover, it can be ascertained that the computing device 110 receives real-time data from various sensors across a plurality of different entities. Still further, in addition to receiving real-time data from sensors, it is to be understood that the computing device 110 may retrieve data about the entities 104, 302, and 304 from textual sources. For instance, a user at the first entity 104 may employ her mobile computing device to publish, by way of a public feed, that the entity 104 is crowded. The computing device 110 can be configured to mine such public feeds and correlate user locations with textual descriptions of parameters of such locations to obtain data about the state of the at least one parameter.

Figure 4:
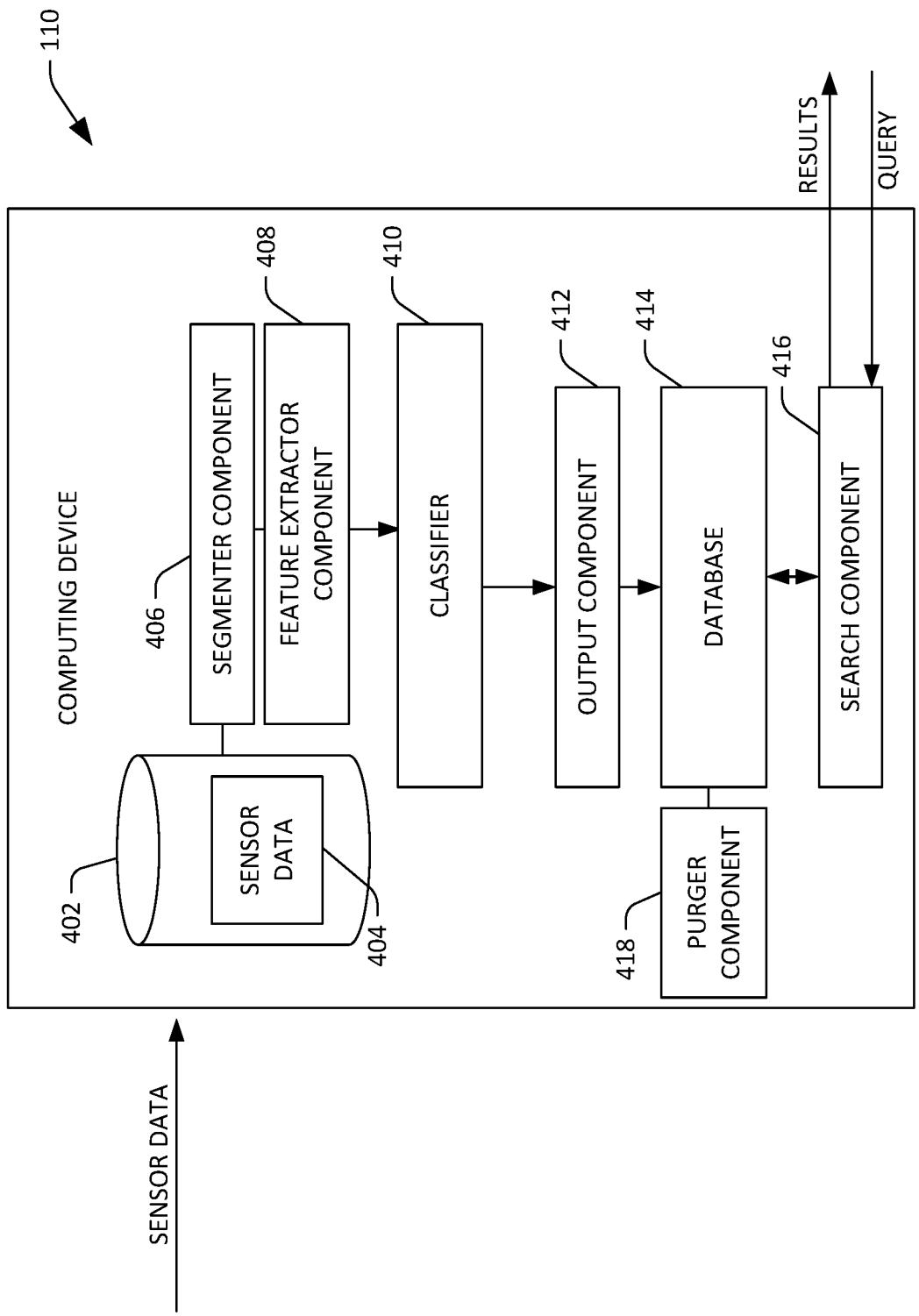
FIG. 4 is a functional block diagram of an exemplary computing device that facilitates processing crowd sourced data about entities to infer states of respective parameters of the entities.

Now referring to FIG. 4, a functional block diagram of the computing device 110 is illustrated. The computing device 110 comprises a data repository 402 that retains sensor data 404 received from a sensor of a mobile computing device (such as the mobile computing device 102). The computing device 110 additionally includes a segmenter component 406 that segments the sensor data 404 into a plurality of time segments. For instance, if the sensor data 404 comprises a ten second signal, the segmenter component 406 can segment such signal into ten non-overlapping one second segments. In another exemplary embodiment, the segmenter component 406 may segment the sensor data 404 into a plurality of segments, at least some of which are partially overlapping. Length of time of the segments and how such segmenting is undertaken over the sensor data 404 can be determined empirically.

A feature extractor component 408 receives segments of the sensor data 404 from the segmenter component 406, and extracts features from the segments that are indicative of respective states of parameters of the entity from which the sensor data 404 has been received. Such features can include temporal features and/or frequency features of the segments, such that a respective temporal signature and a respective frequency signature can be generated by the feature extractor component 408 for each segment. Such signatures can have the form of respective feature vectors, and a feature vector including temporal features and a feature vector including frequency features for a segment of the sensor data 404 can be combined into a single feature vector for the segment. Exemplary features that can be extracted from an audio signal by the feature extractor component 408 that are indicative of states of different parameters of an entity will be described below. While the computing device 110 has been described as including the segmenter component 406, and the feature extractor component 408, it is to be understood that the mobile computing device 102 may comprise such components.

The computing device 110 also comprises a classifier 410 that receives feature vectors for respective segments of the sensor data 404. The classifier 410 is trained to output a classification as to a state of a particular parameter of the entity from which the sensor data is received for each segment of the sensor data 404 based upon the feature vectors for a respective segment. In an exemplary embodiment, the classifier 410 can be trained to output a classification as to a level of occupancy of the entity (e.g., business) from which the sensor data is received. Therefore, the classifier 410, continuing with the example set forth above, can output ten separate classifications as to the occupancy level of the location from which the sensor data is received.

An output component 412 can receive the classifications output by the classifier 410, and can output a final classification as to the state of the parameter for the sensor data 404 based upon the respective classifications for the segments of the sensor data 404. In an exemplary embodiment, a majority voting technique can be employed by the output component 412 to output a classification as to the state of the parameter for the sensor data 404.

The computing device 110 may further comprise a database 414. In an exemplary embodiment, the database 414 can comprise information that is to be included in a search result for the entity from which the sensor data has been received, such as the name of the entity, address of the entity (or geographic coordinates), telephone number of the entity, and the like, and the state of the at least one parameter output by the output component 412 can be retained in the database 414 with such information.

The computing device 110 may further include a search component 416 that receives a query, wherein a search result retrieved responsive to receipt of the query is for the entity from which the sensor data was received. The search result includes up-to-date (recent) information about the state of the at least one parameter of the location that has been output by the output component 412 as described above. Accordingly, for example, the search result for the entity may include the name of the entity, the street address of the entity, contact information for the entity (telephone number), as well as an indication that the entity is currently believed to be highly crowded (e.g., based upon recently received sensor data about the entity). Accordingly, the issuer of the query can obtain information about a current or recent state of a parameter of the entity of interest, which has heretofore been unavailable to searchers.

The computing device 110 may optionally include a purger component 418 that can remove stale information from the database 414. In an exemplary embodiment, the purger component 418 can remove information from the database 414 that is over 30 minutes old.

Additionally, the output component 412 can access the database 414 and generate classifications using the sensor data 404 (which has been recently received from a mobile computing device at the entity) and previously computed classifications for the entity existent in the database 414, wherein such previously computed classifications have been computed relatively recently. Accordingly, for example, the output component 412 can consider classifications (e.g., in a sliding time window) in the database 414 when computing new classifications.

While the computing device 110 is shown as including a single classifier 410, is to be understood that the computing device 110 may include multiple different classifiers that are configured to output classifications of states for multiple different parameters of the entity from which the sensor data was received. For instance, a first classifier may be configured to output a classification as to occupancy level of the entity, a second classifier may be configured to output a classification as to volume of music being played at the entity, a third classifier may be configured to output a classification as to an amount (volume) of background human chatter at the entity, a fourth classifier may be configured to output a classification as to the general noise level at the location, a fifth classifier may be configured to output an indication as to whether there is an outdoor area at the location (e.g., as evidenced by data received from a luminance sensor, GPS, or camera of a mobile computing device), etc. Such classifiers can act in a manner similar to what has been described with respect to the classifier 410, in that the classifiers can output classifications with respect to parameters for multiple segments of received sensor data, and the output component 412 can output a final classification for states of parameters based upon classifications assigned to individual segments.

Moreover, while the purger component 418 has been described as purging data from the database 414, it is to be understood that trend analysis can be undertaken over data in the database 414, such that if the database 414 does not include recently generated classifications with respect to states of one or more parameters of an entity, trend data indicative of historic states of parameters of the entity can be included in the database 414. For instance, if, over time, it can be ascertained, based upon analysis of crowd sourced data, that a particular entity is typically very crowded and loud music is typically played on Saturdays from 5:00 PM to 10:00 PM, and at a particular Saturday data has not been received for such entity, then the database 414 can be configured to include the trend data that indicates that it can be expected that the entity is crowded and plays loud music between the aforementioned hours on Saturdays. Therefore, if a query is issued on a Saturday between 5:00 PM and 10:00 PM, a search result can be returned to an issuer of the query that indicates that, while sensor data has not recently been received, the issuer of the query can expect the entity to be highly crowded and loud music to be playing.

Now referring to FIG. 5, an exemplary search result 500 for an entity is illustrated, wherein data about the entity has recently been received. In an exemplary embodiment, the entity can be a business, and therefore the search result can be for the business. An issuer of the query can specify a location (explicitly or implicitly), and can note in the query that she is searching for a business of a type that corresponds to the entity. The search result 500 can be retrieved, based upon the query, in a manner similar to how conventional local search results are retrieved. For instance, the search result may be ranked in a list of search results based upon proximity of the entity to the location specified by the user. In another exemplary embodiment, the search result 500 can be ranked in a list of search results based upon proximity to the specified location and average rating given by users those that have visited the business.

The search result 500 can include information that is included in conventional local search results, such as the identity of the business, the address of the business, the telephone number of the business, an average rating given by reviewers of the business, and the like. The search result 500 can also include information about a current or recent state of a parameter of the business. As shown, a viewer of the search result 500 can ascertain that the business is currently relatively busy (the occupancy is high), that the level of human chatter is normal, that the level of music volume is low, that an outdoor section exists at the business, and that the overall noise level is low.

Figure 6:
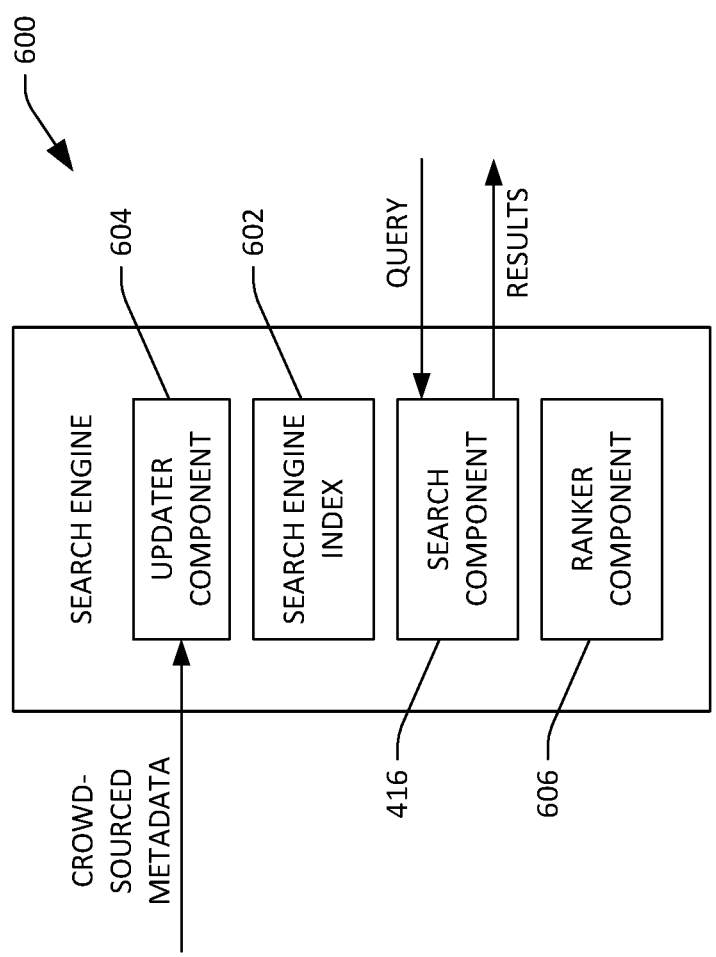
FIG. 6 is a functional block diagram of an exemplary search engine that can rank search results based at least in part upon crowd sourced data about entities represented by such search results.

Now referring to FIG. 6, an exemplary search engine 600 that can rank search results as a function of metadata about entities (e.g., computed/inferred based upon data received from mobile computing devices known to be at such entities) is illustrated. The search engine 600 includes a search engine index 602. The search engine index 602 includes an index of search results that can be retrieved responsive to the search engine receiving queries. The search engine 600 additionally comprises an updater component 604 that updates the search engine index 602 based at least in part upon crowd sourced data. With more particularity, the updater component 604 can receive classifications output by the output component 412 and can update the search engine index 602 based upon such classifications.

The search engine 600 further comprises the search component 416 that receives a query and executes a search over the search engine index 602. A ranker component 606 can rank search results retrieved by the search component 406 based at least in part upon the crowd sourced data. The updating of the search engine index 602 allows the search engine 600 to rank search results based upon current or recent states of parameters of entities represented by the search results. For instance, a restaurant determined to be relatively quiet and playing classical music (through analysis of crowd sourced data) can be returned as a highly ranked search result for a query "quiet four-star restaurant playing classical music".

Figure 7:
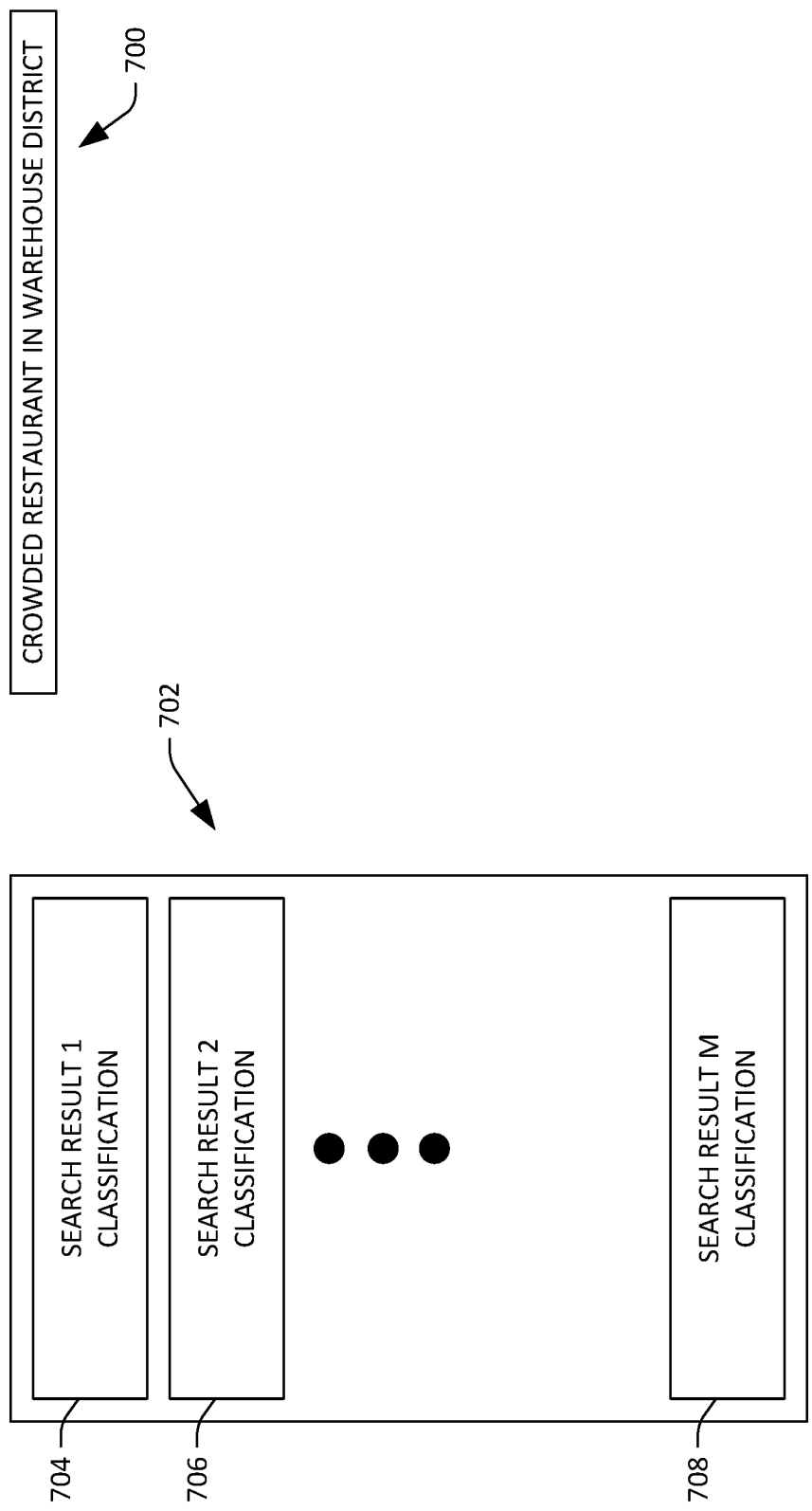
FIG. 7 illustrates an exemplary query and corresponding exemplary search results provided responsive to receipt of such query.

With reference now to FIG. 7, an exemplary query 700 the may be provided to a search engine and exemplary search results 702 that can be retrieved and ranked responsive to receipt of the query are illustrated. The query 700 is requesting information about a "crowded restaurant in the warehouse district". Responsive to receiving the query, the search engine 600 can set forth the list of search results 702, which can include search results 704-708. The search results 702 can be ordered based at least in part upon crowd sourced data received from sensors at the entities represented by the search results 704-708. For example, the search result 704 displayed highest in the ranked list of search results may be found to be relatively busy based upon data recently received from at least one sensor that is at the entity represented by the search result 704. The search engine 600 can consider other features when ranking search results, such as location of the entity represented by the search result, average user rating for the entity represented by the search result, when data about the entity represented by the search result was received, etc.

Figure 8:
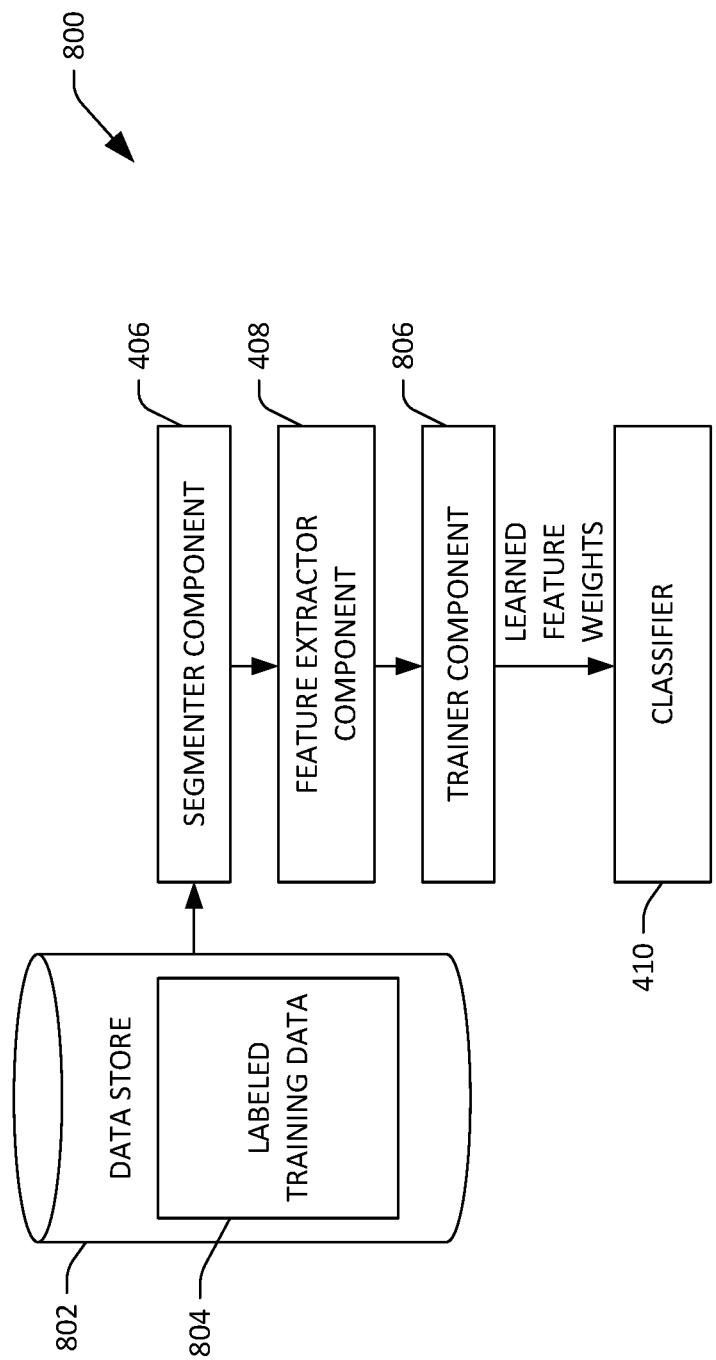
FIG. 8 is a functional block diagram of an exemplary system that facilitates training a classifier to infer metadata about an entity.

Turning now to FIG. 8, an exemplary system 800 that facilitates training the classifier 410 to output a classification with respect to a state of a parameter of an entity from which sensor data is received is illustrated. The system 800 includes a data store 802 that comprises labeled training data 804. For the purposes of explanation, the labeled training data 804 will be described herein as being audio data received from microphones of respective mobile computing devices at different businesses. It is to be understood, however, that the labeled training data 804 is not so limited to audio data and that entities are not to be limited to businesses. Pursuant to an example, human labelers can be instructed to assign labels similar to those shown below in Table 1, wherein the parameters of interest are occupancy, background chatter, music level, and general noise level, and wherein respective states of such parameters are "very high", "high", "normal", and "low", with corresponding definitions for such states. Additionally, labels for the parameters are for an entirety of an audio stream, which may be on the order of ten seconds, fifteen seconds, or the like (e.g., labels need not be assigned to one second segments).

TABLE 1

| Metadata | Class (State) | | | |
|---|---|---|---|---|
| | Very High | High | Normal | Low |
| Occupancy | >80% | 60%-80% | 30%-60% | <30% |
| Background Chatter | Need to yell to be heard | Need to talk loudly to be heard | Normal talking, clearly hear other people | Barely hear other people |
| Music Level | Need to yell to be heard | Need to talk loud to be heard | Normal talking, clearly listen to music | Barely hear music or no music |
| Noise Level | Loud noise | Loud enough to distract you | Typical indoor environmental noise | Barely hear any noise or no noise |

The segmenter component 406 can receive an audio stream from the label training data 804 and segment such audio stream into a plurality of segments. Each segment can be assigned the label that has been assigned to the entirety of the audio stream, thereby creating numerous segments of audio data from the audio stream. The segmenter component 406 can perform such segmentation for each labeled audio stream in the label training data 804.

The feature extractor component 408 may then extract features from each segment provided thereto by the segmenter component 406. Each segment output by the segmenter component 406 can be treated independently, in the sense that feature extraction and classifier training takes place for each segment separately. Segmentation of audio streams can be employed to ensure high classification accuracies; since the overall recording time of each audio stream can be on the orders of tens of seconds, the characteristics of the different sound sources can easily change multiple times during a recording. For instance, in a beginning portion of a recording, there may be people speaking directly in front of the mobile computing device while music is playing. Later, the music can be stopped for a short amount of time as the next song is beginning to be played, and subsequently the people in front of the mobile computing device can stop speaking, such that only background chatter is recorded, etc. Generally, sound sources can significantly change within seconds, resulting in major variations in recorded audio streams. Therefore, using lengthy audio segments that span multiple seconds can pollute the feature extraction process, which in turn can lead to erroneous classification. Segmentation of audio streams can remove such variations, thereby allowing more robust inferences to be made over multiple shorter time windows during a recording.

The feature extractor component 408 is tasked with encoding unique characteristics of different types of sounds, such as background chatter, music, and noise, in each of the segments provided thereto by the segmenter component 406. This approach enables inference models to accurately recognize different sound levels in an audio stream, even though all of such sounds are simultaneously recorded using a single microphone. To achieve this, smoothness and amplitude of audio signals can be examined by the feature extractor component 408 in both the temporal and frequency domains. First, the feature extractor component 408 can generate short-term features over sub-second audio windows, wherein the duration of such windows can vary, depending upon the exact feature that is being extracted. The feature extractor component 408 may then generate second long-term features by examining statistics of the short term features over all sub-second windows within a segment. Accordingly, for every feature, and for each segment, its mean, minimum, and maximum values can be recorded over all different sub-second windows, as well as its overall variation across these windows. This set of long-term features can form the actual feature vector that describes each segment and can be what is output by the feature extractor component 408.

Exemplary features that can be extracted by the feature extractor component 408 and for training the classifier 410 and for use by the classifier 410 to classify a state of at least one parameter are now set forth. Such features are exemplary and are not intended to be interpreted as an exhaustive list. Furthermore, for the purposes of an example, the features relate to features that can be extracted from audio streams captured by a microphone of a mobile computing device. Again, this is set forth for purposes of explanation, and is not intended to be limiting.

In the temporal domain, a recorded audio stream describes the amplitude of the audio stream over time. Absolute amplitude information can be utilized for estimating the loudness (volume) of the audio stream, either as music, human chatter, or people talking close to a microphone of a mobile computing device. To capture differences in the absolute amplitude, depending upon the type of parameter (music, human chatter, or near phone talking), the energy E of a recorded audio signal can be calculated as the root mean square of the audio samples $s_i$ as follows:

$$E = \sqrt{\frac{\sum_{i=1}^{N} sign(s_i)^2}{N}} \quad (1)$$

where N is the total number of samples. Energy can be calculated over sliding windows of some threshold time duration (e.g., 50 ms). Using a 50 ms duration, if a microphone sampling rate is 16 KHz, and segments are one second in length, an energy value can be computed a total of 15,201 times within each segment.

Relative amplitude information, and in particular the smoothness of amplitude over time, can additionally provide insight about the recorded audio stream. In general, human talking includes continuous repetitions of consonants and vowels, resulting in audio signals with high energy and zero cross rate (ZCR) variations in short time windows. It has been found through experiment that a recording of background music tends to be a far "smoother" audio signal than a recording of human talking. For example, the energy in ZCR variations in the signal are almost negligible compared to the ones found in audio signals when people are actually talking. This difference holds even when comparing a person talking with the person singing the exact same word or sentence. The energy variance during normal human speech is significantly smoothed out during singing because of the different pronunciation of consonants and vowels (e.g., prolonging vowels, etc.). To capture this fundamental difference between human talking and music in an audio signal, ZCR, as well as the variation of both ZCR and energy can be computed as follows:

$$ZCR = \frac{\sum_{i=1}^{N} |sign(s_i) - sign(s_i - 1)|}{2} \quad (2)$$

$$ZCR_{var} = \sqrt{\frac{\sum_{i=1}^{N} |ZCR_i - ZCER_{mean}|^2}{N-1}} \quad (3)$$

$$E_{var} = \sqrt{\frac{\sum_{i=1}^{N} |E_i - E_{mean}|^2}{N-1}}. \quad (4)$$

Similar to energy, ZCR can be computed over sliding time windows of some threshold duration (e.g., 50 ms). Using a 50 ms duration, if a microphone sampling rate is 16 KHz, and segments are one second in length, 15,201 ZCR values can be computed for each segment. In an exemplary embodiment, $ZCR_{var}$ and $E_{var}$ can be computed using longer sliding windows that overlap with a predefined step size. If the segment duration is one segment, duration of the sliding window is 500 ms, and the step size is 100 ms, five $ZCR_{var}$ and five $E_{var}$ values can be computed for each segment. Using the segment duration, microphone sampling rate, subwindow durations, and step size set forth above, 30,412 features can be computed for each segment:

$$F_{s.t.}^{temp.} = \{E_{s.t.} = E^1, \ldots, E^{15201}], ZCR_{s.t.}[ZCR^1, \ldots ZCR^{15201}], E_{s.t.}^{var} = [E_{VAR}^1, \ldots, E_{VAR}^5], ZCR_{s.t.}^{var} = [ZCR_{VAR}^1, \ldots, ZCR_{VAR}^5]\} \quad (5)$$

$F_{s.t.}^{temp.}$ represents short-term features generated from the sub-second audio segment processing. Such features are not directly used as input to the classifier training stage, but instead statistics for each of the four different types of short-term temporal features are computed. Specifically, the minimum, maximum, mean, and variation values of E, ZCR, $ZCR_{var}$, and $E_{var}$ are computed over all values in Eq. (5) as follows:

$$F_{l.t.}^{temp.} = \{\{min,max,mean,var\}(E_{s.t.}),\{min,max,mean,var\}(ZCR_{s.t.}), \{min,max,mean,var\}(E_{s.t.}^{var}), \{min,max,mean,var\}(ZCR_{s.t.}^{var})\}. \quad (6)$$

$F_{l.t.}^{temp.}$ therefore 16 long-term features for each segment. This set of temporal features represents a temporal signature of each segment and can be used as input during training of the classifier 410, and can likewise be used as input for classification undertaken by the classifier 410.

Frequency domain features can also be extracted by the feature extractor component 408. The feature extractor component 408 can utilize similar processing of the audio stream to analyze the magnitude of the audio stream across frequencies and its smoothness over time. Such features can capture parts of the underlying structure of the audio stream that temporal features might not be able to accurately capture. When frequency and temporal domain features are combined, a more descriptive feature set is generated, and thus, a more robust basis for accurate classifier training and (and therefore accurate classification) is formed.

In the frequency domain, the feature extractor component 408 can calculate the spectrogram of the recorded audio stream. This can be undertaken by dividing the audio stream into relatively small non-overlapping windows and computing the Fast Fourier Transform (FFT) for each window. The spectrogram can then be computed by the feature extractor component 408 by concatenating all the different FFTs. In essence, the spectrogram describes the magnitude of the audio stream at different frequencies over time, and forms the basis for feature extraction.

Directly encoding a spectrogram as a feature is not a scalable approach, as a large number of features would be generated, posing stringent restrictions on data collection and model training. Instead, building components of the spectrogram can be leveraged to extract a relatively small feature set. For instance, for each segment provided by the segmenter component 406, a 512-point FFT of the audio signal can be calculated (32 ms time window given a 16 KHz microphone sampling rate) in 31 non-overlapping windows. For each of the 31 FFTs, the DC component can be deleted and the remaining frequency bins can be normalized, such that the sum of squares is equal to one. $p_t(i)$ is used to denote the magnitude of the ith frequency bin of the normalized FFT at time t. The spectrogram can be summarized by computing spectral centroid (SC), bandwidth (BW), and spectral flux (SF), as follows:

$$SC = \frac{\sum_{i=1}^{N} i * p(i)^2}{\sum_{i=1}^{N} p(i)^2}, N = 256, \quad (7)$$

$$BW = \frac{\sum_{i=1}^{N} (i - SC)^2 * p(i)^2}{\sum_{i=1}^{N} p(i)^2}, N = 256, \quad (8)$$

$$SF_t = \sum_{i=1}^{N} (p_t(i) - p_{t-1}(i))^2, N = 256 \quad (9)$$

Both spectral centroid and bandwidth can be computed for each one of the 31 FFTs over a single segment, resulting in 31 SC and 31 BW features. Additionally, spectral flux can be computed for every consecutive pair of FFTs, resulting in 30 SF features for each segment.

Intuitively, spectral centroid represents the center frequency of the computed FFT and is calculated as the weighted mean of the frequencies present in the normalized FFT, with the magnitude of these frequencies as the weights. Bandwidth is a measure of the width/range of frequencies in the computed FFT. Finally, spectral flux represents the spectrum difference in adjacent FFTs and is an indication of the variation of spectral density over time.

In addition to spectral centroid bandwidth and spectral flux, Mel-Frequency Cepstral Coefficients (MFCCs) can be computed by the feature extractor component 408. MFCCs are coefficients that collectively make up an MFC, which is a representation of the short-term power spectrum of a sound. MFC coefficients have been widely used in speech recognition and speaker identification, and are considered high-quality descriptors of human speech.

To compute MFC coefficients, numerous sliding windows with particular step sizes can be employed. In an exemplary embodiment, 256 sample sliding windows with a step size of 128 samples (given a 16 KHz microphone sampling rate) can be employed. This results in 124 windows for each segment. For each window, the first twelve MFCC coefficients can be leveraged, and the ith MFCC coefficient at window t can be denoted as $MFCC^t(i)$.

As a result, given the exemplary numbers set forth above, the set of short-term frequency domain features extracted over each segment can include 1580 features:

$$F_{s.t.}^{freq} = \left\{\left\{\begin{array}{l} SC_{s.t.} = [SC^1, \ldots, SC^{31}], BW_{s.t.} = \\ [BW^1, \ldots, BW^{31}], SF_{s.t.} - [SF^1, \ldots SF^{30}] \end{array}\right\},\right.$$

$$\left. MFCC_{s.t.}(i) = [MFCC^1(i), \ldots, MFCC^{124}(i),], i = 1, \ldots, 12\right\} \quad (10)$$

The long-term features that are eventually used during classifier training are computed directly from the short-term frequency features. Similarly to the temporal domain feature extraction, the minimum, maximum, mean, and variation values of SC, BW and SF, as well as the mean values for each of the 12 MFCC coefficients are computed over all the short-term feature values in Eq. 10, resulting in the following long-term frequency features:

$$F_{l.t.}^{temp.} = \begin{Bmatrix} \{min, max, mean, var\}(SC_{s.t.}), \\ \{min, max, mean, var\}(BW_{s.t.}), \\ \{min, max, mean, var\}(SF_{s.t.}), \\ \{mean\}(MFCC_{s.t.}(i)), i = 1, ..., 12 \end{Bmatrix} \quad (11)$$

$F_{l.t.}^{temp.}$ includes, therefore, 24 features for each segment. This set of long-term features represents the frequency signature of each segment of the audio stream, and is used as input during the classifier training phase, and such features of audio streams are also input to the classifier 410 when performing classification.

As described above, audio streams can be mapped to feature vectors, thereby allowing the labeled training data 804 to be leveraged to train classifiers to output classifications to states of parameters that are desirably inferred. The labeled training data 804 can be utilized to bootstrap the training process, and a relatively small number of audio streams (approximately 100) may be sufficient to train accurate classifiers. In an exemplary embodiment, each audio stream in the labeled training data 804 can be associated to one of four different labels, as shown in Table 1 above, for each type of parameter that is desirably inferred. For instance, labels for occupancy, human chatter, music, and noise levels are provided for each audio recording.

The system 800 includes a trainer component 806 that receives the features extracted by the feature extractor component 408 and the labels assigned to the label training data 804 and learns feature weights for the parameter type for which states are desirably inferred. The trainer component 806 can utilize a variety of machine-learning approaches to multiclass classification to learn a mapping between feature values and labels representing the state of a specific parameter type. In an exemplary embodiment, the classifier 410 can be a decision tree.

By leveraging real audio streams captured at entities (businesses), wherein such audio streams are properly labeled with information of when people were talking near the microphone (near-phone talking) or not, an additional classifier can be built for inferring when an audio stream includes near-phone talking. Audio stream segmentation, feature extraction, and training for a near phone talking classifier can be undertaken as described above with respect to the classifier 410. The only difference are the binary labels (near phone talking or not) assigned to the feature vectors during the training process. The near phone talking model can be used in two ways. First, audio streams for which near phone talking has been detected can be filtered from being employed as training data, since near-phone talking can dominate the audio stream and hide the background sounds that are desirably; ignoring such streams helps to remove noise. Additionally, instead of completely removing audio streams, the output of the near phone talking classifier can be leveraged at run-time as a binary input feature for other classifiers. In such a way, enough information can be provided in the training phase to enable classifiers to adjust to near-phone talking audio streams and maintain high recognition rates.

Returning to FIG. 4, at runtime, having trained classifiers for each type of parameter that is desirably the subject of classification, the level or state of various parameters of interest can be inferred. This can occur as described above, where sensor data can be split into segments, and temporal and frequency domain features can be computed for each of such segments. The trained classifier 410 can take computed feature vectors for each segment as input, and probabilistically map the feature vector to one of several pre-specified states of the parameter. The label with the highest probability can be assigned to each segment, and then majority voting across all segments can be applied to infer the state of the parameter. This process can create a real-time stream of crowd sourced data about locations (businesses). At any given time, when a user searches for nearby local businesses, search engines can leverage recently inferred metadata to inform the user about the state of the parameter of the business at the time of the query.

With reference now to FIGS. 9-12, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable storage medium or media. The computer-executable instructions may include a routine, a sub-routine, programs, a thread of execution, and/or the like. Still further, results of acts of the methodologies may be stored in a computer-readable storage medium, displayed on a display device, and/or the like.

Figure 9:
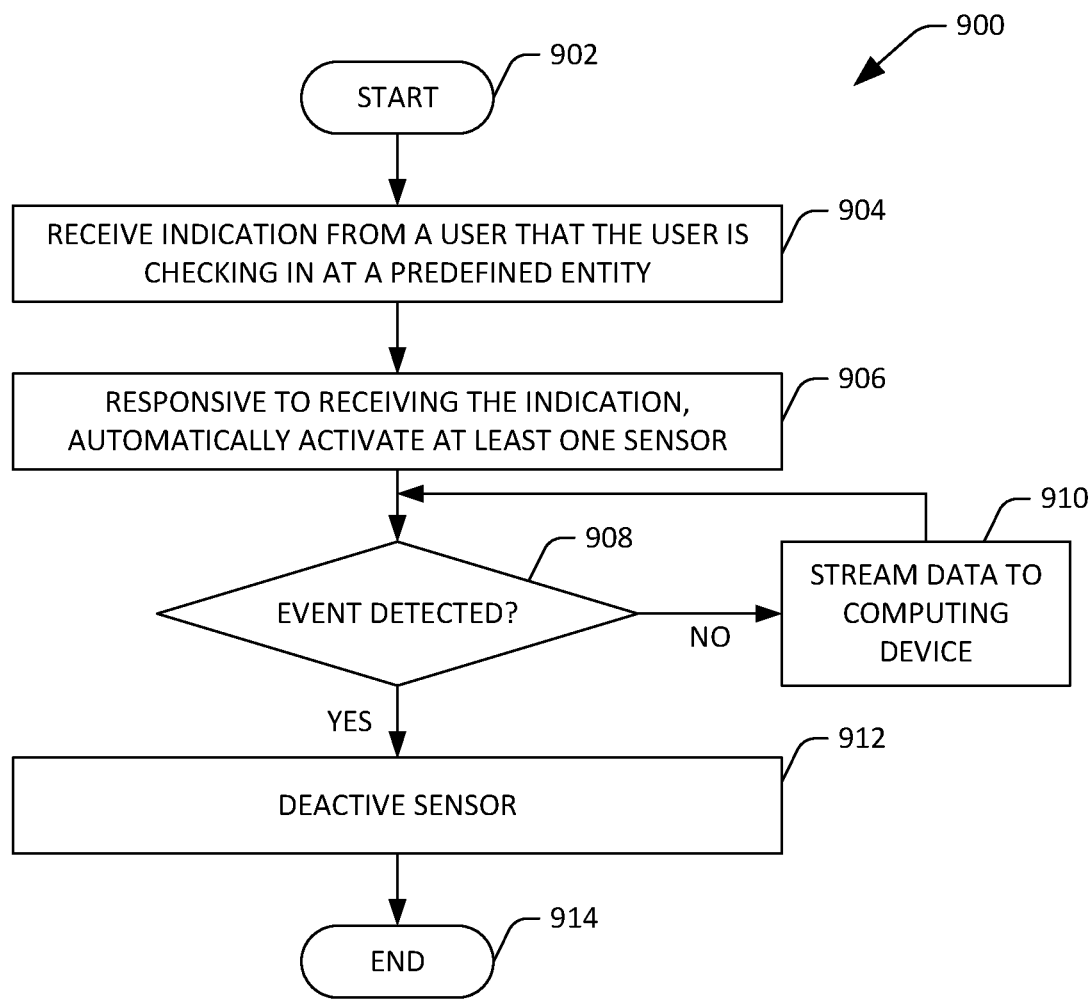
FIG. 9 is a flow diagram that illustrates an exemplary methodology for configuring a mobile computing device to provide data about an entity.

With reference now to FIG. 9, an exemplary methodology 900 that facilitates the use of a mobile computing device to generate crowd sourced data about an entity is illustrated. The methodology 900 starts at 902, and at 904 an indication from a user is received that the user is checking in at an entity that is predefined in a social networking application. Such entity may be a business, such as an eatery. At 906, responsive to receiving indication, at least one sensor of the mobile computing device is activated. In other words, the at least one sensor is transitioned from an inactive state to an active state. Pursuant to an example, and as noted above, the at least one sensor may be a microphone that is configured to generate an audio stream/signal.

At 908, a determination is made regarding whether a predefined event has been detected. For instance, the predefined event may be receiving an indication that a user has depressed a power button (to put the mobile computing device in a low power mode). In another example, the predefined event may be passage of a threshold amount of time since the sensor has been activated. In yet another example, the predefined event may be the obtainment of a suitable reading from the sensor. Generally, such threshold amount of time may be relatively short, such as on the order of 5 seconds, 10 seconds, or 15 seconds. In an exemplary embodiment, if the predefined event has not been detected since the at least one sensor was transitioned to the active state, then the methodology 900 proceeds to 910, where data captured by the at least one sensor while in the active state can be streamed to a computing device by way of a wireless network. If the predefined event has been detected, then at 912, the at least one sensor is deactivated (transition from the active state to the inactive state).

In another exemplary embodiment, rather than streaming the data to the computing device, the mobile computing device can be configured to generate a data packet that includes the entirety of an audio stream (which may optionally be compressed and transmit the data packet to the computing device after the threshold amount of time is passed). In still another example, the mobile computing device can process raw sensor data to generate feature vectors that are respectively indicative of at least one state of a parameter of an entity for numerous time segments, and the mobile computing device can transmit the feature vectors to the computing device. The methodology 900 completed 914.

Figure 10:
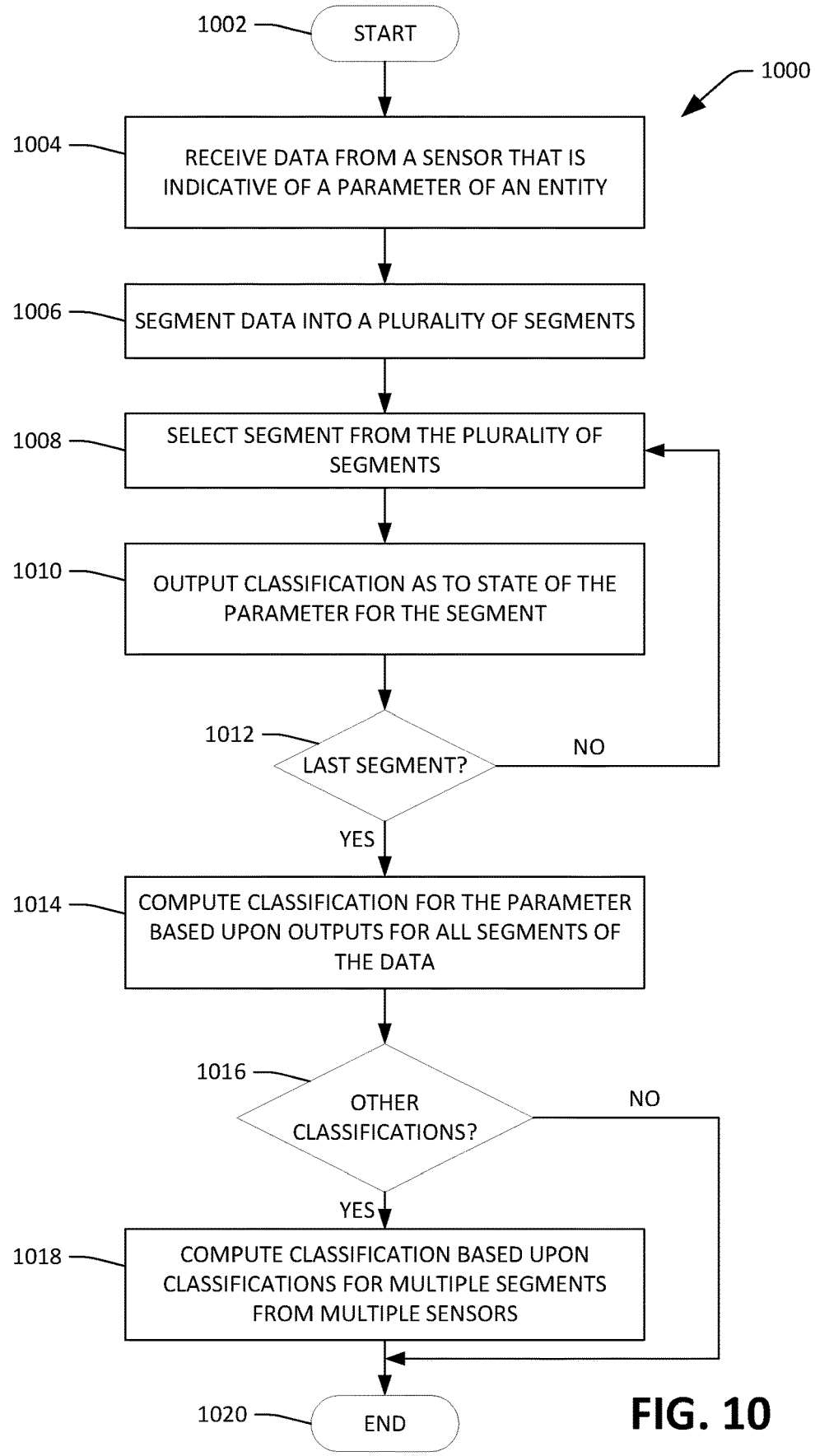
FIG. 10 is a flow diagram that illustrates an exemplary methodology for utilizing a classifier to infer a state of a parameter of an entity based at least in part upon data about the entity received from a mobile computing device.

With reference now to FIG. 10, an exemplary methodology 1000 for assigning a classification as to a state of at least one parameter of an entity (business) is illustrated. The methodology 1000 starts at 1002, and at 1004 data from a sensor of a mobile computing device that is indicative of a state of a parameter of the entity is received. As noted above, in an example, such data may be an audio stream.

The 1006, the data is segmented into a plurality of segments. As noted above, such segments can be approximately one second non-overlapping segments. In other examples, the segments may be partially overlapping, and duration of such segments may be shorter or longer than one second.

At 1008, a segment is selected from the plurality of segments, and at 1010 a classification for the state of the parameter of the entity is output for the selected segment. As noted above, a feature vector can be generated that can be viewed as a signature for the segment, and a classifier can map the feature vector to one of several classes based upon feature weights learned during training of the classifier and values of the feature vector. At 1012, a determination is made if the segment over which the classifier has been executed is the last segment in the plurality of segments. If there are more segments in the plurality of segments that have not been analyzed, then the methodology 1000 returns to 1008. If it is determined at 1012 that the segment is the last segment, then at 1014, a classification for the state of the parameter is computed based at least in part upon classifications for the states of the parameter for all segments.

At 1016, a determination is made regarding whether previous classifications within some threshold time window had been undertaken for the entity/parameter. If there are previous classifications within the time window, then at 1018, a final classification as to the state of the parameter of the entity is computed based upon the classification output at 1014 and the previous classifications. The methodology 1000 completed 1020.

Figure 11:
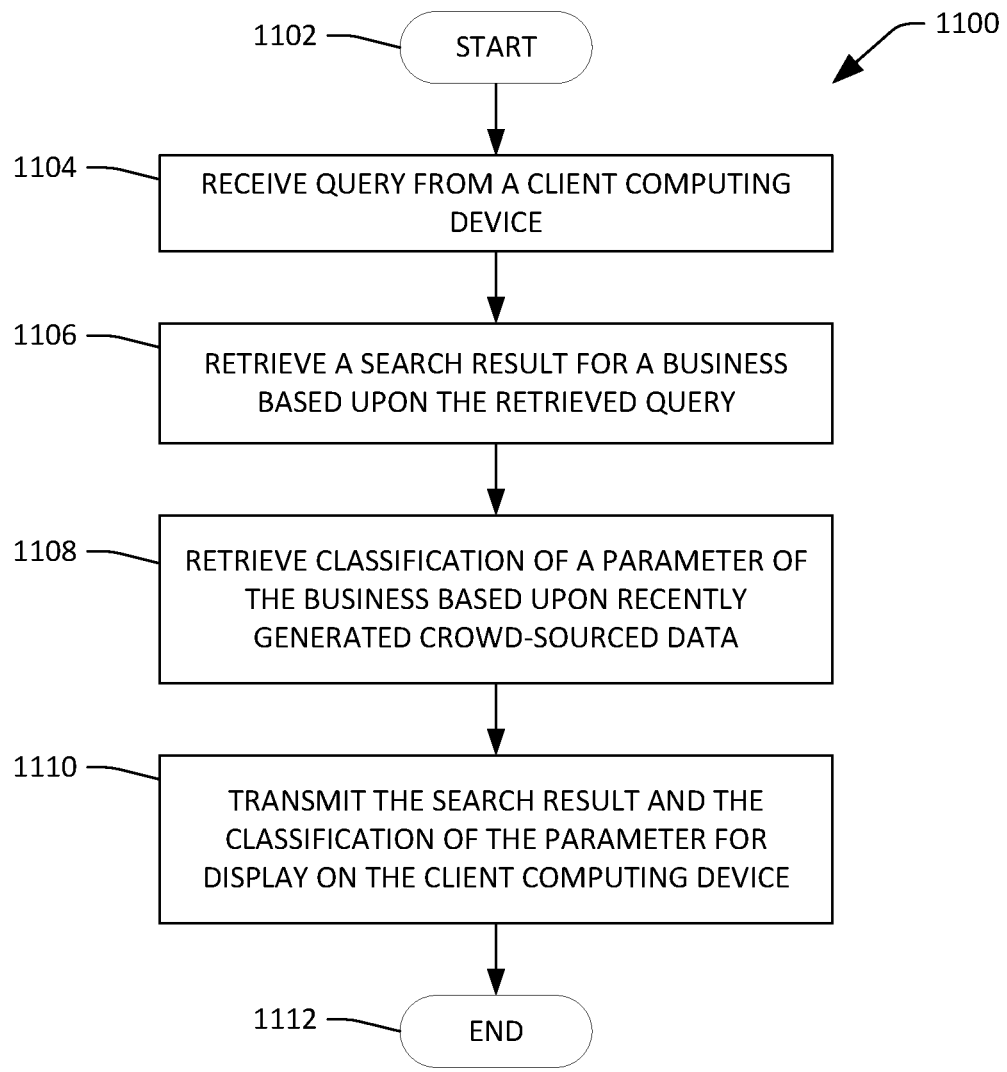
FIG. 11 is a flow diagram that illustrates an exemplary methodology for providing a search result responsive to receipt of a query, wherein the search result depicts information based upon real-time or near real-time metadata about an entity corresponding to the search result.

With reference now to FIG. 11, an exemplary methodology 1100 that facilitates provision of real-time information about a parameter of an entity to an issuer of a query is illustrated. The methodology 1100 starts 1102, and at 1104 a query from a client computing device is received. At 1106, a search result is retrieved for a business based upon the received query. At 1108, a classification as to a state of a parameter of the business is retrieved, wherein the classification is based upon recently generated crowd sourced data. At 1110, the search result and the classification as to the state of the parameter are transmitted for display on the computing device of the user. The methodology completes at 1112.

Figure 12:
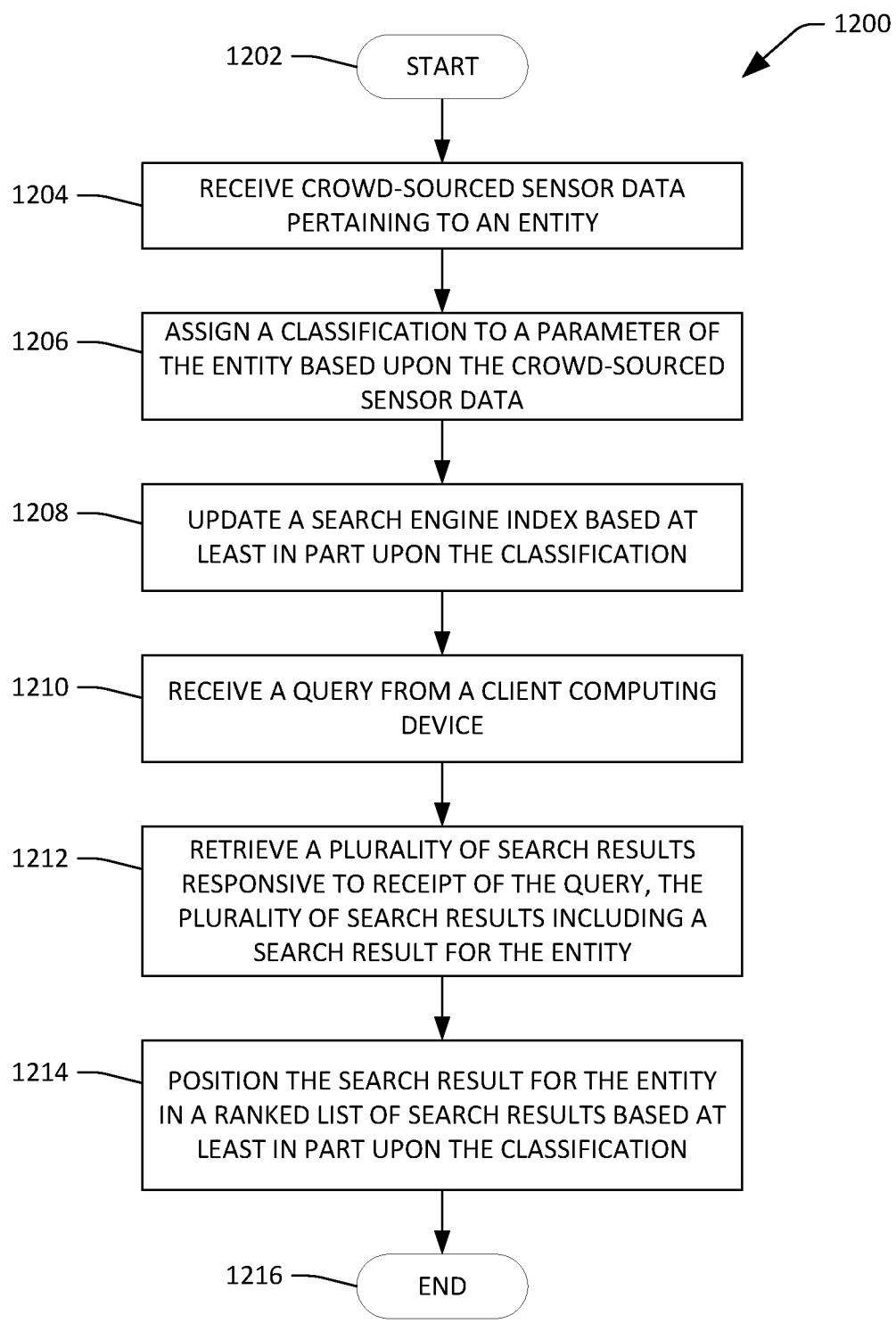
FIG. 12 is a flow diagram that illustrates an exemplary methodology for ranking search results based at least in part upon real-time or near real-time metadata about entities represented by the search results.

Now referring to FIG. 12, an exemplary methodology 1200 for ranking search results based at least in part upon crowd sourced data is illustrated. The methodology 1200 starts at 1202, and at 1204 crowd sourced sensor data pertaining to an entity (business) is received. At 1206, a classification as to a state of the parameter for the entity based upon the crowd sourced sensor data. At 1208, a search engine index is updated based at least in part upon the classification.

At 1210, a query is received from a client computing device, wherein the query is configured to retrieve information about the entity. Further, the query can include a terms that relate to a near-time or real-time context of the entity. At 1212, a plurality of search results is retrieved responsive to receipt of the query, wherein the plurality of search results includes a search result for the entity. At 1214, the search result for the entity is positioned in a ranked list of search results based at least in part upon the classification assigned at 1206. The methodology 1200 completed 1216.

Figure 13:
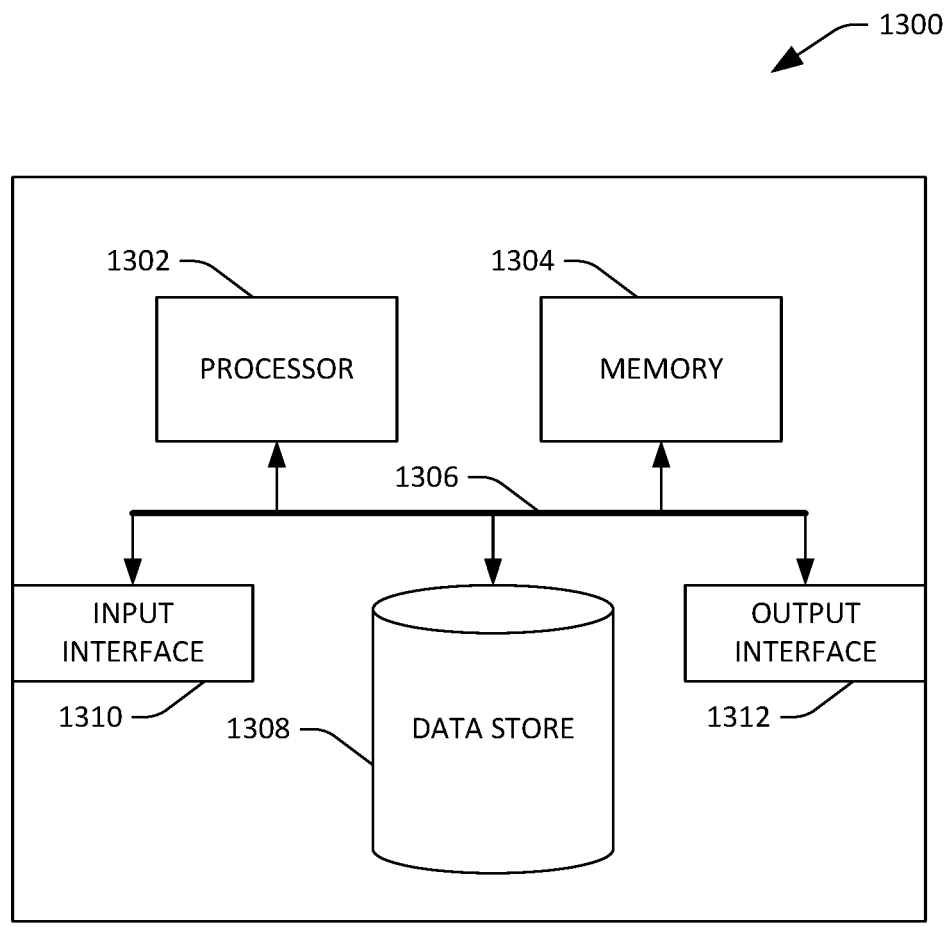
FIG. 13 is an exemplary computing system.

Now referring to FIG. 13, a high-level illustration of an exemplary computing device 1300 that can be used in accordance with the systems and methodologies disclosed herein is illustrated. For instance, the computing device 1300 may be used in a system that supports capturing data about an entity. In another example, at least a portion of the computing device 1300 may be used in a system that supports inferring a state of a parameter of an entity based at least in part upon crowd sourced sensor data about the entity. The computing device 1300 includes at least one processor 1302 that executes instructions that are stored in a memory 1304. The memory 1304 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store sensor signals, trained classifiers, etc.

The computing device 1300 additionally includes a data store 1308 that is accessible by the processor 1302 by way of the system bus 1306. The data store may be or include any suitable computer-readable storage, including a hard disk, memory, etc. The data store 1308 may include executable instructions, sensor signals, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A computing system comprising:
   a processor; and
   memory storing instructions that, when executed by the processor, cause the processor to perform acts comprising:
      based upon a query received from a client computing device that is in network communication with the computing system, identifying an entity that is at a geographic location;
      determining a current state of a parameter of the entity, wherein the current state of the parameter of the entity is determined based upon data generated by sensors of mobile computing devices, wherein the mobile computing devices were at the geographic location when the data was generated;
      constructing a search result based upon the entity and the determined state of the parameter of the entity, wherein the search result comprises an identity of the entity and the current state of the parameter of the entity; and
      transmitting the search result for display on a display of the client computing device, wherein the search result, when displayed on the display of the client computing device, depicts the current state of the parameter of the entity.

2. The computing system of claim 1, the acts further comprising:
   ranking the search result relative to a plurality of other search results based upon the query and the current state of the parameter of the entity.

3. The computing system of claim 1, wherein the query received from the client computing device identifies a geographic region that includes the geographic location.

4. The computing system of claim 1, wherein the data was generated by the sensors within thirty minutes from when the query is received by the computing system.

5. The computing system of claim 1, wherein determining the current state of the parameter of the entity comprises:
   identifying values for features of the data generated by the mobile computing devices, wherein the features are indicative of the current state of the parameter of the entity; and
   providing the values for the features of the data to a classifier, wherein the classifier generates an output based upon the values for the features of the data, and further wherein the output is representative of the current state of the parameter.

6. The computing system of claim 1, wherein the mobile computing devices are mobile telephones.

7. The computing system of claim 1, wherein the parameter is one of music volume, type of music being played at the entity, or level of occupancy at the entity.

8. The computing system of claim 1, the acts further comprising:
   determining current states of several parameters of the entity based upon the data generated by the mobile computing devices, wherein the search result, when displayed on the display of the client computing device, depicts the current states of the several parameters of the entity.

9. A method performed by a computing system that executes a search engine, the method comprising:
   based upon a query received from a client computing device that is in network communication with the computing system, identifying an entity, wherein the entity is at a geographic location;
   determining a current state of a parameter of the entity based upon crowdsourced data generated by sensors of mobile computing devices of users, wherein the mobile computing devices were at the geographic location when the crowdsourced data was generated by the sensors of the mobile computing devices;
   responsive to determining the current state of the parameter of the entity, generating a search result for the query, wherein the search result comprises an identity of the entity and the determined current state of the parameter of the entity; and
   causing the search result to be displayed on a display of the client computing device, wherein the search result, when displayed, depicts the identity of the entity and the determined current state of the parameter of the entity.

10. The method of claim 9, further comprising ranking the search result relative to several other search results based upon the determined current state of the parameter of the entity.

11. The method of claim 9, wherein the crowdsourced data is generated within thirty minutes from when the query is received.

12. The method of claim 9, wherein the mobile computing devices are mobile telephones.

13. The method of claim 9, wherein the parameter of the entity is one of:
   a level of occupancy at the entity;
   a volume of music being played at the entity;
   a type of music being played at the entity; or
   an identity of a song being played at the entity.

14. The method of claim 9, further comprising:
   prior to determining the current state of the parameter of the entity, discarding other crowdsourced data about the entity previously received from one or more mobile computing devices, wherein the other crowdsourced data is discarded based upon a time when the other crowdsourced data was received.

15. The method of claim 9, wherein determining the current state of the parameter comprises:
   providing the crowdsourced data to a classifier, wherein the classifier is trained to output classifications that are indicative of states of the parameters of entities; and determining the current state of the parameter of the entity based upon an output of the classifier when the classifier was provided with the crowdsourced data.

16. The method of claim 9, wherein the crowdsourced data is based upon audio signals captured by microphones of the mobile computing devices.

17. The method of claim 9, wherein the query comprises data that is indicative of a geographic region that comprises the geographic location.

18. A computing system comprising:
   a processor; and
   memory storing instructions that, when executed by the processor, cause the processor to perform acts comprising:
      receiving, from several mobile telephones over a window of time, data that is indicative of a current state of a parameter of an entity, wherein the entity is at a geographic location, and further wherein the several mobile telephones are at the geographic entity when the mobile telephones generated the data;
      determining, based upon the data received from the mobile telephones, the current state of the parameter of the entity;
      receiving a query from a client computing device, wherein the query comprises an indication of a geographic region that includes the geographic location of the entity;
      generating a search result based upon the query, wherein the search result comprises an identity of the entity and the current state of the parameter of the entity; and
      transmitting the search result to the client computing device, wherein the client computing device displays the search result on a display in response to receive of the search result.

19. The computing system of claim 18, the acts further comprising:
   positioning the search result in a ranked list of search results based upon the current state of the parameter of the entity; and
   transmitting the ranked list of search results to the client computing device.

20. The computing system of claim 18, wherein the parameter is a level of human chatter at the entity.

* * * * *